United States Patent Office 3,032,575
Patented May 1, 1962

3,032,575
METHOD FOR PREPARATION OF SILICON-CYANIDE COMPOUNDS
Walter O. Freitag, Conshohocken, and Ernest Charles Evers, Philadelphia, Pa., assignors, by mesne assignments, to the United States of America as represented by the Secretary of the Navy
No Drawing. Filed May 19, 1960, Ser. No. 30,390
2 Claims. (Cl. 260—448.2)

This invention relates to novel means for the preparation of cyanides from readily available silicon and cyanide compounds, and more particularly pertains to methods for the preparation of trimethylsilyl cyanide using trimethylsilyl chloride and hydrocyanic acid as starting materials.

Heretofore the preparation of trimethylsilyl cyanide has been carried out by the reaction of trimethylsilyl iodide or trimethylsilyl bromide with silver cyanide. The use of trimethylsilyl chloride was found to be not suitable; reporting in the Journal of the American Chemical Society, 74, 5247 (1952), J. J. McBride Jr. and H. C. Beachell noted that the chloride was considerably less reactive in this reaction than the bromide or iodide.

Thus the old method, employing silver cyanide, requires the less readily available trimethylsilyl bromide or iodide in addition to the relatively expensive silver cyanide reagent. The trimethylsilyl bromide or iodide must be prepared, too, from trimethylsilyl chloride by methods requiring several steps.

In the method that is the subject of the present invention, hydrocyanic acid is introduced into an inert solvent in the presence of lithium metal, by passing a stream of dry hydrogen cyanide gas and argon into a dispersion of lithium metal in diethyl ether, and trimethylsilyl chloride is then added. Preferably, the lithium metal is in the form of a dispersion in mineral oil, and the inert solvent is ethyl ether. (Alternatively, other alkali metals can be substituted for lithium.) The addition of trimethylsilyl chloride to this mixture causes vigorous evolution of hydrogen gas. The stoichiometry can be expressed by the equation

(The reaction apparently occurs without the intermediate formation of lithium cyanide). Trimethylsilyl cyanide can then be fractionally distilled from the product mixture at atmospheric pressure.

This method avoids the use of costly silver cyanide, and avoids the several operations necessary to first convert trimethylsilyl chloride to the corresponding bromide and iodide. All starting materials for the preparation of trimethylsilyl cyanide are available readily commercially, and the reaction proceeds rapidly, giving pratically quantitative yields.

The method of this invention is applicable to any preparation involving the replacement of a chlorine atom on a silicon atom by a cyanide group. For example, it can be used in the preparation of triethylsilyl cyanide from triethysilyl chloride, or of dimethyldicyanosilane from dimethyldichlorosilane. Other weak acids, such as cyanic acid, thiocyanic acid, hydrazoic acid or other compounds having a potentially protonic hydrogen atom, such as phosphine, arsine, pentaborane, and decaborane can be substituted for the hydrocyanic acid, resulting in the placement of cyanate, thiocyanate, azide, etc. groups on to a silicon atom, or resulting in the formation of phosphorus, arsenic, boron, etc. compounds of silicon.

Obviously many modifications and variations of the present invention are possible in the light of the above teachings. It is therefore to be understood that within the scope of the appended claims the invention may be practiced otherwise than as specifically described.

We claim:
1. The process for making trimethylsilyl cyanide which comprises introducing hydrocyanic acid into ethyl ether in the presence of lithium, adding trimethylsilyl chloride, and fractionally distilling trimethylsilyl cyanide from the product mixture at atmospheric pressure.
2. The process for making trimethylsilyl cyanide which comprises passing a stream of dry hydrogen cyanide gas and argon into a dispersion of lithium metal in diethyl ether, adding trimethylsilyl chloride, and fractionally distilling trimethylsilyl cyanide from the product mixture at atmospheric pressure.

References Cited in the file of this patent
FOREIGN PATENTS
630,145 Germany _____ May 22, 1936
962,784 Germany _____ Apr. 25, 1957

OTHER REFERENCES
Prober: Jour. Am. Chem. Soc., vol. 78 (1956), pp. 2274–7.
Bither et al.: Jour. Am. Chem. Soc., vol. 80 (1958), pp. 4151–3.